United States Patent [19]

Makowecki

[11] Patent Number: 5,687,638

[45] Date of Patent: Nov. 18, 1997

[54] APPARATUS FOR PRODUCING FILLED FOOD PRODUCTS

[75] Inventor: Walter Makowecki, Edmonton, Canada

[73] Assignee: 562186 Alberta Ltd., Edmonton, Canada

[21] Appl. No.: 531,295

[22] Filed: Sep. 20, 1995

[51] Int. Cl.$^6$ .............................. A21C 9/00; A21C 9/06; A21C 11/00; A23P 1/00
[52] U.S. Cl. .............. 99/353; 99/355; 99/450.6; 99/450.7; 425/133.1; 425/308
[58] Field of Search ................ 99/352, 353–355, 99/450.1, 450.8, 483, 494, 403–407; 425/112, 131.1, 133.1, 307, 308; 426/283, 523, 503

[56] References Cited

U.S. PATENT DOCUMENTS

| | | | |
|---|---|---|---|
| 3,858,497 | 1/1975 | Ishida | 99/450.6 |
| 4,112,127 | 9/1978 | Popeil | 426/283 |
| 4,160,634 | 7/1979 | Huang | 425/112 |
| 4,381,906 | 5/1983 | Mancini | 99/450.6 X |
| 4,382,970 | 5/1983 | Sorensen | 426/275 |
| 4,574,690 | 3/1986 | Shiao et al. | 99/353 |
| 4,579,744 | 4/1986 | Thulin et al. | 426/283 |
| 4,618,499 | 10/1986 | Wainwright | 426/283 |
| 4,794,009 | 12/1988 | Dreisin | 426/283 |
| 4,848,218 | 7/1989 | Battaglia | 99/450.7 |
| 4,882,185 | 11/1989 | Simelunas et al. | 426/283 |
| 4,941,402 | 7/1990 | D'Alterio | 99/450 |
| 4,996,914 | 3/1991 | D'Alterio | 99/450 |
| 5,010,807 | 4/1991 | Anderson et al. | 99/450 |
| 5,216,946 | 6/1993 | Huang et al. | 99/353 |

FOREIGN PATENT DOCUMENTS

| | | | |
|---|---|---|---|
| 1043170 | 11/1978 | Canada | 107/12 |
| 1199528 | 1/1986 | Canada | 107/12 |
| 1218902 | 3/1987 | Canada | 107/24 |
| 1244288 | 11/1988 | Canada | 107/15 |
| 2008579 | 7/1990 | Canada | 99/90 |
| 2013569 | 9/1990 | Canada | 107/7 |
| 2029215 | 6/1991 | Canada | 99/191.4 |
| 2039802 | 10/1991 | Canada | 107/1 |
| 2068361 | 11/1992 | Canada | A23P 1/10 |
| 2088848 | 8/1993 | Canada | A21C 9/08 |
| 1818044 | 5/1993 | Russian Federation | A21C 9/06 |

Primary Examiner—Timothy F. Simone
Attorney, Agent, or Firm—Anthony R. Lambert

[57] ABSTRACT

A method for increasing efficiency in a co-extrusion process for producing filled food products. The prior art co-extrusion process included a co-extrusion die for extruding an elongated cylindrical filled food shell which contains a filler material. A conveyor was used to advance the extruded filled food shell from the co-extruder along a predetermined path. A rotary stamping disk partitioned the cylindrical filled food shell into filled food segments. The present method includes providing multiple co-extrusion dies with parallel aligned outlets extruding a plurality of parallel elongated cylindrical filled food shells containing a filler material along the predetermined path. The rotary stamping disk has at least one circumferential row of stamping dies for each of the plurality of cylindrical filled food shells, such that the circumferential rows of stamping dies on the rotary stamping disk partition the plurality of cylindrical filled food shells into a plurality of rows of filled food segments.

8 Claims, 4 Drawing Sheets

APPARATUS FOR PRODUCING FILLED FOOD PRODUCTS

FIELD OF THE INVENTION

The present invention relates to a method and apparatus for increasing efficiency and reducing wastage in a co-extrusion process for producing filled food products using a rotary stamper disk.

BACKGROUND OF THE INVENTION

U.S. Pat. No. 5,216,946 which issued to Huang et al in 1993 describes an apparatus for producing a precooked pasta product, ie. ravioli. This apparatus includes a co-extruder die for extruding an elongated cylindrical pasta shell which contains a filler material. A conveyer is provided for advancing the extruded pasta shell from the co-extruder along a predetermined path. A rotary stamper disk is provided for partitioning the cylindrical pasta shell into ravioli segments. A dryer is provided downstream of the rotary stamper disk along the predetermined path for the purpose of drying the ravioli segments.

Notwithstanding the issue of U.S. Pat. No. 5,216,946, the Applicant has been working with equipment which meets the description in the Huang et al reference for more than two decades. The original equipment was developed in the Ukraine and imported into Canada for installation in the Applicant's perogy processing plant. In working with this equipment over the years, the Applicant has sought means to increase process efficiency. Soviet Union Patent 1,818,044, which bears the Applicant's name as co-inventor with Ukraine technicians, discloses the state of development of the equipment in 1991. The Soviet Union Patent discloses a structure similar to that of the Huang et al reference with a co-extruder die for extruding an elongated cylindrical pasta shell which contains a filler material. A conveyer is provided for advancing the extruded pasta shell from the co-extruder along a predetermined path to a rotary stamper disk. The filled food segments are then carried by the conveyor through a steam cooker, a blast freezing tunnel and finally to a packaging machine. The equipment, as disclosed, was not particularly efficient as its output per hour was limited.

SUMMARY OF THE INVENTION

What is required is a method and apparatus for increasing efficiency in a co-extrusion process for producing filled food products using a rotary stamper disk.

According to one aspect of the present invention there is provided a method for increasing efficiency in a co-extrusion process for producing filled food products. This prior art co-extrusion process developed in the Ukraine includes a co-extrusion die for extruding an elongated cylindrical filled food shell which contains a filler material, means for advancing the extruded filled food shell from the co-extruder along a predetermined path, and means is provided for partitioning the cylindrical filled food shell into filled food segments. The method for increasing efficiency includes providing multiple co-extrusion dies with parallel aligned outlets extruding a plurality of parallel elongated cylindrical filled food shells containing a filler material along the predetermined path. The means for partitioning the cylindrical filled food shell into filled food segments is positioned transversely across the predetermined path.

With the method, as described above, output can be increased in multiples depending upon the number of co-extrusion dies that are used. Beneficial results have been obtained through the use of three co-extrusion dies to triple output. It is preferred that a rotary stamper disk be used. The rotary stamper disk has at least one circumferential row of stamping dies for each of the plurality of cylindrical filled food shells, such that the circumferential rows of stamping dies on the rotary stamper disk partition the plurality of cylindrical filled food shells into a plurality of rows of filled food segments.

Although beneficial results may be obtained through the use of the method, as described above, wastage of material will still occur due to inefficiencies in the die configuration. Ravioli has traditionally been produced with a peripheral border. When the teachings of Huang et al are switched from the production of ravioli to the production of other pasta products, this border must be cut away thereby resulting in substantial wastage of material. Even more beneficial results may, therefore, be obtained when the rotary stamper disk has two circumferential rows of stamping dies for each of the plurality of cylindrical filled food shells. The two rows of stamping dies as arranged in a closely spaced staggered interlocking configuration, thereby reducing wastage. This configuration works particularly well with crescent shaped products, such as perogies and dumplings. There is virtually no wastage, as what little dough is positioned between the stamping dies is required to seal the edges of the filled food. With this configuration the use of three co-extrusion dies can increase production six fold, as two rows of filled food segments are produced by each of the of cylindrical filled food shells extruded by the three co-extrusion dies.

According to another aspect of the present invention there is provided an apparatus for producing filled food products. This apparatus has extruding means that includes multiple co-extrusion dies with parallel aligned outlets extruding a plurality of parallel elongated cylindrical filled food shells containing a filler material. Means is provided for advancing the plurality of parallel elongated cylindrical filled food shells from the extruding means along a predetermined path. A rotary stamper disk is provided for partitioning the cylindrical filled food shell into filled food segments. The rotary stamper disk is positioned transversely across the predetermined path. The rotary stamper disk has at least one circumferential row of stamping dies for each of the plurality of cylindrical filled food shells, such that the circumferential rows of stamping dies on the rotary stamper disk partition the plurality of cylindrical filled food shells into a plurality of rows of filled food segments.

Although beneficial results may be obtained through the use of the apparatus, as described above, even more beneficial results may be obtained when the rotary stamper disk has two circumferential rows of stamping dies for each of the plurality of cylindrical filled food shells. The two rows of stamping dies are arranged in a closely spaced staggered interlocking configuration. This configuration reduces wastage of materials. With end products of a shape that can be easily interlocked, this configuration virtually eliminates wastage.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
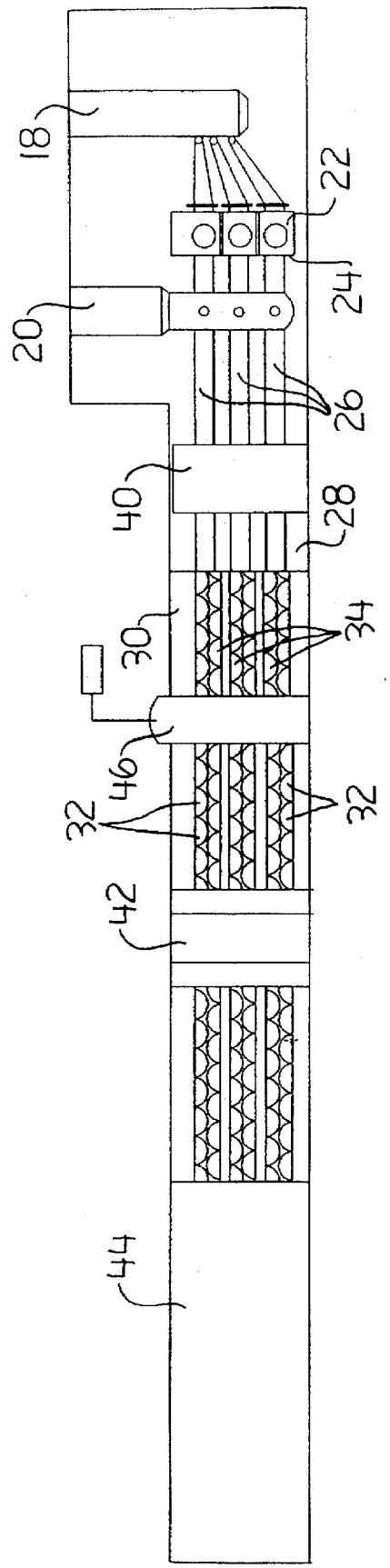
FIG. 1 is a top plan view of an apparatus for producing filled food products constructed in accordance with the teachings of the present invention.

The preferred embodiment, an apparatus for producing filled food products generally identified by reference numeral 10, will now be described with reference to FIGS. 1 through 5.

Figure 2:
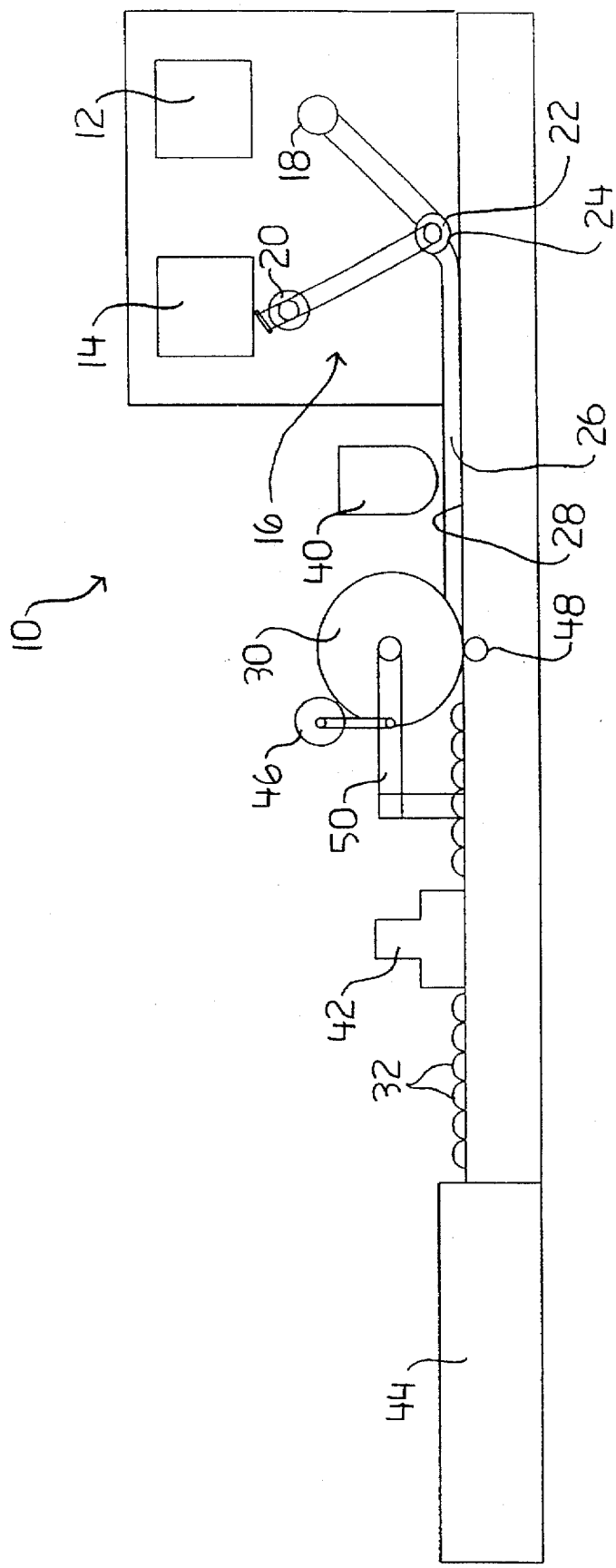
FIG. 2 is a side elevation view of the apparatus for producing filled food products illustrated in FIG. 1.
Figure 3:
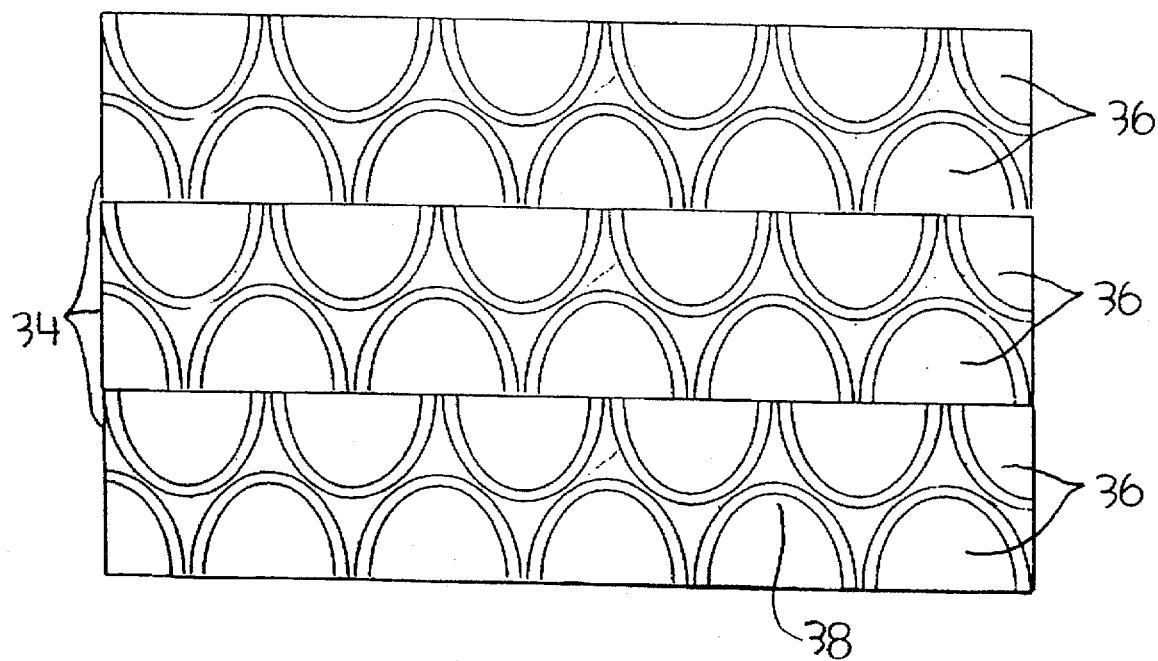
FIG. 3 is a detailed top plan view of a rotary stamper disk illustrated in FIG. 1.
Figure 4:
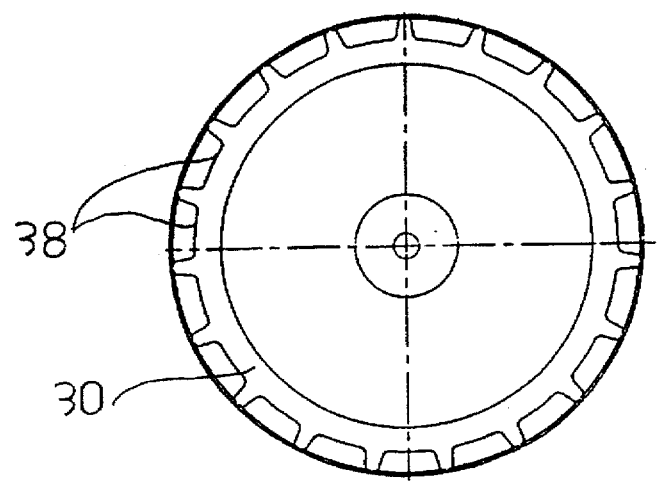
FIG. 4 is a side elevation view in section of the rotary stamper disk illustrated in FIG. 3.
Figure 5:
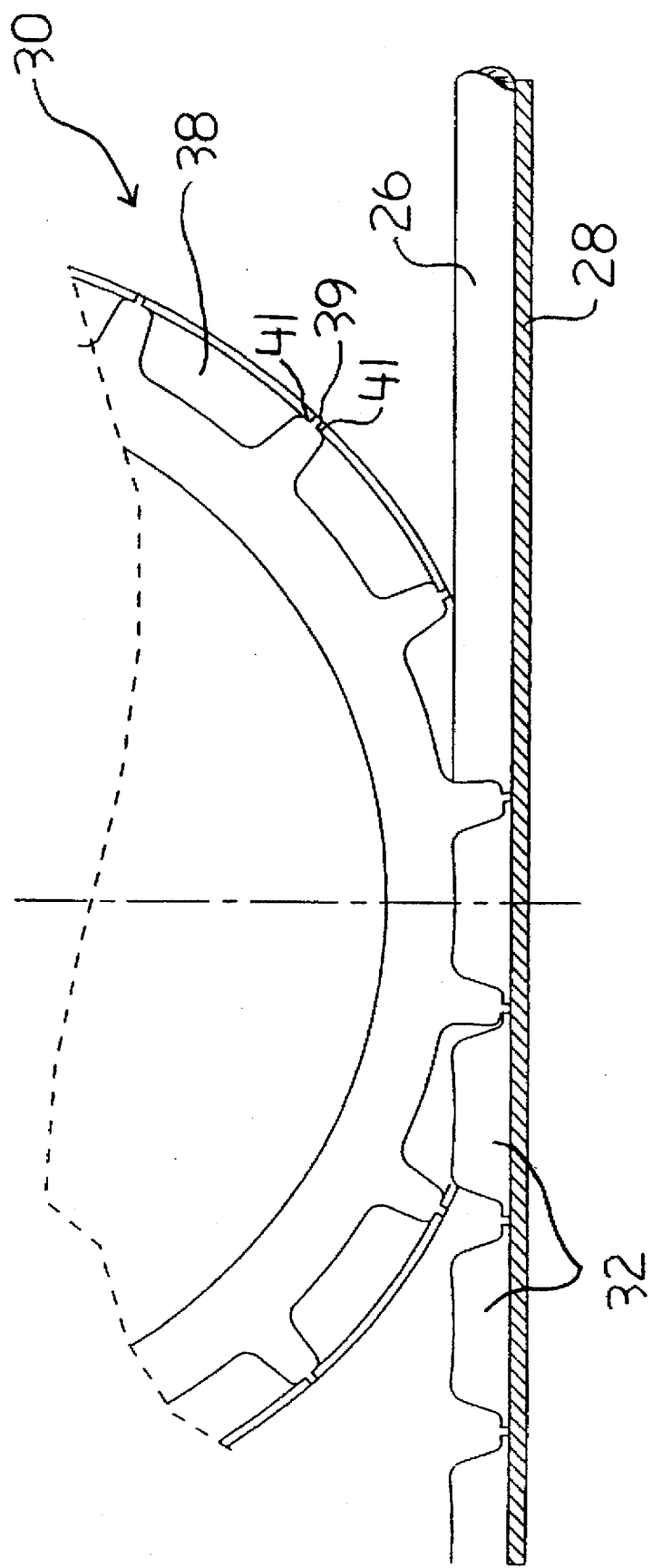
FIG. 5 is a detailed side elevation view of a portion of the rotary stamper disk illustrated in FIG. 4.

Referring to FIGS. 1 and 2, apparatus 10 includes a filler hopper 12 and a dough hopper 14. An extruder is provided, which is generally identified by reference numeral 16. A filler feed line 18 leads from filler hopper 12 into extruder 16. A dough feed line 20 leads from dough hopper 14 into extruder 16. Referring to FIG. 2, extruder 16 includes three co-extrusion dies 22. Co-extrusion dies 22 have parallel aligned outlets 24 which extrude three parallel elongated cylindrical filled food shells 26 containing a filler material. Referring to FIG. 2, a conveyor 28 is used as the means for advancing the three elongated cylindrical filled food shells 26 from the co-extrusion dies 22 along a predetermined path defined by conveyor 28. A rotary stamper disk 30 is provided for partitioning the three elongated cylindrical filled food shells 26 into filled food segments 32. Referring to FIG. 1, rotary stamper disk 30 is positioned transversely across conveyor 28 in the path of the three elongated cylindrical filled food shells 26. Referring to FIG. 3, rotary stamper disk 30 has a circumferential profile section 34 for each of the three elongated cylindrical filled food shells 26. Each circumferential profile section 34 has two circumferential rows 36 of crescent shaped stamping dies 38. Stamping dies 38 are best illustrated in FIG. 4. Referring to FIG. 3, the two circumferential rows 36 of stamping dies 38 are arranged in a closely spaced staggered interlocking configuration. Referring to FIG. 5, each stamping die 38 has a protruding peripheral cutting edge 39 bordered by peripheral sealing lips 41. The depth and shape of stamping die 38 is dependent upon the type of filled food product being produced. There is illustrated a crescent shaped stamping die that is suited for the production of perogies or dumplings. The objective of the interlocking configuration is to obtain a reliable seal on the filled food product, without having excessive waste of materials. In order to achieve this objective the depth and width of the sealing lips are carefully selected. Referring to FIGS. 1 and 2, the operational plant has the following additional components. A flour shaker 40 is provided for shaking flour onto elongated cylindrical filled food shells 26 prior to their passage through rotary stamper disk 30. A vacuum chamber 42 is provided to vacuum excess flour from filled food segments 32 and conveyor 28 as filled food segments 32 exit rotary stamper disk 30. A steam cooker 44 is provided along the path of conveyor 28 downstream of vacuum chamber 42. A motor driven cylindrical nylon bristle brush 46 is positioned parallel to and in engagement with rotary stamper disk 30. Referring to FIG. 2, Cylindrical nylon bristle brush 46 serves two functions, it cleans rotary stamper disk 30 and, along with conveyor 28 imparts a rotary motion to rotary stamper disk 30. Rotary stamper disk 30 is rotated solely be means of friction imparted by engagement with cylindrical brush 46 and conveyor 28. The importance of coordination between the movement of elongated cylindrical filled food shells and rotary stamper disk 30 cannot be over emphasized. The use of friction to drive rotary stamper disk 30 has been found to be a superior to reliance upon a use of a drive motor as taught by Huang et al for coordinating such movement. Both rotary stamper disk 30 and cylindrical nylon bristle brush 30 are supported by a support arm 50. A support roller 48 underlies conveyor 28.

The method of use of apparatus 10 will now be described with reference to FIGS. 1 through 5. Filler from filler hopper 12 and dough from dough hopper 14 are fed into extruder 16 through filler feed line 18 and dough feed line 20, respectively. The dough and the filler pass through the three co-extrusion die 22, exits through the respective outlets 24 of co-extrusion die 22 in the form of elongated cylindrical filled food shells 26. Elongated cylindrical filled food shells 26 are moved by conveyor 28 to rotary stamper disk 30. Each of elongated cylindrical filled food shells 26 engage two circumferential rows 36 of stamping dies 38. Referring to FIG. 5, as rotary stamper disk 30 rotates peripheral cutting edge 39 of stamping dies 38 divide the elongated cylindrical filled food shells into filled food segments 32 and peripheral sealing lips 41 seal the edges of such filled food segments 32.

It will be apparent to one skilled in the art from a review of the teachings of the present invention that the use of multiple co-extrusion dies 22 will result in increased production efficiency. Output over the same time period can be increased by a multiple determined by the number of co-extrusion dies 22 utilized. It will also be apparent to one skilled in the art that the rotary stamper disk, as described, will even further increase output. It will finally be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for producing filled food products, comprising:
    extruding means including multiple co-extrusion dies with parallel aligned outlets extruding a plurality of parallel elongated cylindrical filled food shells containing a filler material;
    a single conveyor belt for advancing the plurality of parallel elongated cylindrical filled food shells from the extruding means along a predetermined path; and
    a single rotary stamper disk in contact with the conveyor belt, the rotary stamper disk having a plurality of circumferential rows of stamping dies positioned transversely across the predetermined path whereby the cylindrical filled food shells are partitioned into filled food segments.

2. The Apparatus as defined in claim 1, having the rotary stamper disk in friction engagement with the conveyor thereby imparting rotary motion to the rotary stamper disk upon forward movement of the conveyor belt.

3. The Apparatus as defined in claim 1, having the rotary stamper disk in friction engagement with a motor driven cylindrical bristle brush thereby imparting rotary motion to the rotary stamper disk upon rotation of the bristle brush.

4. The Apparatus as defined in claim 1, wherein the rotary stamper disk has two circumferential rows of stamping dies for each of the plurality of cylindrical filled food shells, the two rows of stamping dies being arranged in a closely spaced staggered interlocking configuration.

5. The Apparatus as defined in claim 4, wherein the stamping dies are crescent shaped.

6. An apparatus for producing filled food products, comprising:

extruding means including multiple co-extrusion dies with parallel aligned outlets extruding a plurality of parallel elongated cylindrical filled food shells containing a filler material;

a single conveyor belt for advancing the plurality of parallel elongated cylindrical filled food shells from the extruding means along a predetermined path; and a single rotary stamper disk in contact with the conveyor belt for partitioning the cylindrical filled food shells into filled food segments positioned transversely across the predetermined path, the rotary stamper disk having at least one circumferential row of stamping dies for each of the plurality of cylindrical filled food shells, such that the circumferential rows of stamping dies on the rotary stamper disk partition the plurality of cylindrical filled food shells into a plurality of rows of filled food segments, each of the stamping dies having a peripheral cutting edge whereby the elongated cylindrical filled food shells are divided into filled food segments and peripheral sealing lips being positioned on either side of the peripheral cutting edge whereby the edges of such filled food segments are sealed, the rotary stamper disk having two circumferential rows of stamping dies for each of the plurality of cylindrical filled food shells, the two rows of stamping dies being arranged in a closely spaced staggered interlocking configuration.

7. The Apparatus as defined in claim 6, wherein the dies are crescent shaped.

8. The Apparatus as defined in claim 6, wherein rotary motion of the rotary stamper disk is imparted by friction resulting from engagement of the rotary stamper disk with the conveyor such that rotary motion to the rotary stamper disk upon forward movement of the conveyor and from a motor driven cylindrical bristle brush thereby imparting rotary motion to the rotary stamper disk upon rotation of the bristle brush.

* * * * *